(12) United States Patent
Chaudhary et al.

(10) Patent No.: US 11,809,319 B2
(45) Date of Patent: Nov. 7, 2023

(54) CONTENTION TRACKING FOR PROCESSOR CACHE MANAGEMENT

(71) Applicant: NVIDIA Corporation, Santa Clara, CA (US)

(72) Inventors: Anurag Chaudhary, San Jose, CA (US); Christopher Richard Feilbach, Santa Clara, CA (US); Jasjit Singh, San Francisco, CA (US); Manuel Gautho, Truckee, CA (US); Aprajith Thirumalai, Santa Clara, CA (US); Shailender Chaudhry, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 3 days.

(21) Appl. No.: 17/580,353

(22) Filed: Jan. 20, 2022

(65) Prior Publication Data
US 2023/0244603 A1  Aug. 3, 2023

(51) Int. Cl.
*G06F 12/0811* (2016.01)
*G06F 12/0815* (2016.01)
*G06F 12/123* (2016.01)

(52) U.S. Cl.
CPC ...... *G06F 12/0811* (2013.01); *G06F 12/0815* (2013.01); *G06F 12/123* (2013.01)

(58) Field of Classification Search
None
See application file for complete search history.

(56) References Cited

U.S. PATENT DOCUMENTS

| 10,394,682 B2 | 8/2019 | Song et al. | |
| 2006/0015700 A1* | 1/2006 | Burka | G06F 9/526 711/163 |
| 2006/0031658 A1* | 2/2006 | Swanberg | G06F 9/485 712/E9.071 |
| 2007/0067530 A1* | 3/2007 | Siegwart | G06F 9/52 710/200 |
| 2013/0254488 A1* | 9/2013 | Kaxiras | G06F 9/3004 711/130 |

(Continued)

OTHER PUBLICATIONS

Yan et al. (Terascale Chip Multiprocessor Memory Hierarchy and Programming Model; pp. 150-159) ISBN: 978-1-4244-4921-7 (Year: 2009).*

*Primary Examiner* — Kaushikkumar M Patel
(74) *Attorney, Agent, or Firm* — Lowenstein Sandler LLP

(57) ABSTRACT

The technology disclosed herein involves tracking contention and using the tracked contention to manage processor cache. The technology can be implemented in a processor's cache controlling logic and can enable the processor to track which locations in main memory are contentious. The technology can use the contentiousness of locations to determine where to store the data in cache and how to allocate and evict cache lines in the cache. In one example, the technology can store the data in a shared cache when the location is contentious and can bypass the shared cache and store the data in the private cache when the location is uncontentious. This may be advantageous because storing the data in shared cache can reduce or avoid having multiple copies in different private caches and can reduce the cache coherency overhead involved to keep copies in the private caches in sync.

21 Claims, 7 Drawing Sheets

(56) References Cited

U.S. PATENT DOCUMENTS

| | | | |
|---|---|---|---|
| 2015/0089153 A1* | 3/2015 | Busaba | G06F 12/0815 |
| | | | 711/141 |
| 2016/0098303 A1* | 4/2016 | Balakrishnan | G06F 9/52 |
| | | | 718/102 |
| 2016/0110283 A1* | 4/2016 | Iyigun | G06F 12/084 |
| | | | 711/130 |
| 2016/0253221 A1* | 9/2016 | Song | G06F 9/52 |
| | | | 718/106 |
| 2018/0004574 A1 | 1/2018 | Accapadi et al. | |
| 2018/0081810 A1* | 3/2018 | King | G06F 12/0815 |
| 2019/0317746 A1* | 10/2019 | Liu | G06F 9/4856 |
| 2019/0384743 A1 | 12/2019 | Lv et al. | |
| 2020/0151100 A1 | 5/2020 | Mashimo et al. | |
| 2021/0034438 A1* | 2/2021 | Sonnelitter, III | G06F 12/0802 |
| 2022/0374287 A1* | 11/2022 | Dice | G06F 12/0802 |

* cited by examiner

CONTENTION TRACKING FOR PROCESSOR CACHE MANAGEMENT

TECHNICAL FIELD

Embodiments of the disclosure relate generally to processor cache, and more specifically, relate to tracking contention and managing cache and memory operations based on the contention.

BACKGROUND

The data stored in memory is often accessed by different threads executing on one or more processors. The processors often store local copies of the data in cache to speed up access to the data. The threads typically cooperate with one another and take turns modifying the data to avoid overwriting each other's modifications.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
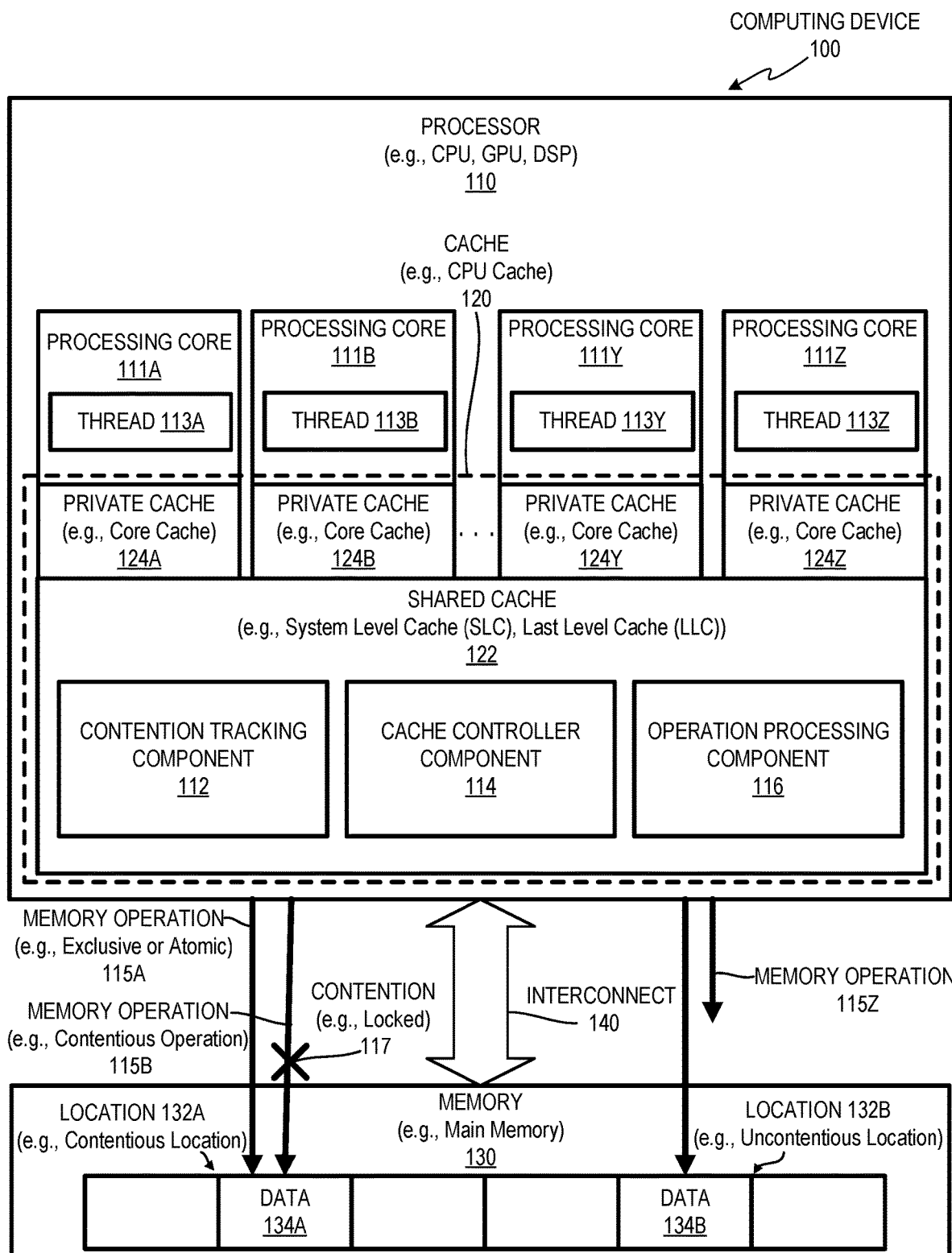
FIG. 1 illustrates an example computing device that includes a processor and a memory, in accordance with some embodiments of the present disclosure.

Aspects of the present disclosure are directed to computer systems that can track contention and use the tracked contention to manage processor cache, perform out-of-order processing of memory operations, or a combination thereof. The contention can arise when multiple threads are contending with one another to access data in memory. The data can be referred to as contentious data and can include the content of variables that are read and written to by the threads. Computer systems often manage contention by enabling one of the threads to access the data and causing the remaining threads to wait until the thread finishes. The thread may perform one or more operations on the contentious data before finishing. The remaining threads wait for the one or more operations to complete and for the data to become accessible. In one example, the contention can be managed using locks and can be referred to as lock contention. An initial thread can acquire a lock for the data and waiting threads can each attempt to acquire the lock and access the data. Waiting for the data to become accessible may decrease the performance of the computer system and may cause the contentious data to contribute to a performance bottleneck.

Processor cache is designed to increase the performance of the computer system by storing copies of the data closer to cores of the processor so that the data can be accessed faster. The processor can include a set of cores and the processor cache can include a shared cache that is shared by the set of cores and private caches that are each private to one of the cores. The processor cache can store multiple copies of the data in the cache and can use a cache coherence technique to keep the copies synchronized. The cache coherence technique can detect a change to one of the copies and update one or more of the copies to indicate a copy is stale, to replace a copy, or a combination thereof. When the data is accessed by threads on different cores the processor cache typically stores a copy of the data in the private cache for each of those cores. Having multiple copies of data that are being modified often can increase the overhead of the cache coherence technique and may adversely affect the performance of the computer system.

Aspects of the present disclosure address the above and other deficiencies by providing technology that enables a processor to detect contention for data in memory and use the contention to manage the cache, manage memory operation processing, or a combination thereof. The technology can involve enabling a processor to identify a location in memory and to determine whether the location is contentious. The location in memory can correspond to one or more physical, virtual, or logical addresses in memory. The location can be determined to be contentious if any thread has been unable to access the location because it was in use by another thread. For example, a first thread may have acquired a lock on the data at the location (e.g., ticket lock) and a second thread may be blocked from accessing the data while it is locked. Once the location is determined to be contentious, it may remain contentious after it is unlocked since it is more likely to be the subject of thread contention again in the future. The contention can be tracked by updating one or more data structures to indicate whether locations are contentious, uncontentious, or a combination thereof (e.g., contention table, contention bit flag in cache entry).

The processor can use the contentiousness of locations to manage the cache. The technology can control whether or not to store the data in the cache (e.g., shared cache) and how to allocate and evict entries in cache (e.g., cache lines, cache blocks). As discussed above, the cache can include copies of the data from main memory and can store copies of the data in one or more private caches, shared caches, or a combination thereof. The processor can determine whether the location is contentious before, during, or after receiving the data that is at the location in main memory. The processor can store the data in the shared cache when the location is contentious and can bypass the shared cache (e.g., avoid storing in shared cache) and store the data in the private cache when the location is uncontentious. This may be advantageous because storing the data in shared cache can reduce or avoid having multiple copies in the different private caches (e.g., avoid duplicate copies in the L2 caches). When the data is contentious, this can significantly reduce the cache coherency overhead involved to keep the copies in the private caches in sync. In one example, the technology can be implemented in the processor's cache controlling logic (e.g., cache controller circuitry and/or control registers).

The processor can also or alternatively use the contentiousness of locations to manage the processing of memory operations. The threads executed by a processor can generate memory operations that can be added to a queue (e.g., an ordered set) to be processed. As discussed above, a thread that is accessing data at a location may execute multiple operations on the data before the thread is finished using the data. The multiple operations can be added to the queue and the queue may include one or more intervening operations between them. The operations in the queue can have a particular order, such as First-in-First-out (FiFo). The processor can process some of the operations based on the order of the queue and can process some of the operations out-of-order.

Each of the operations can be associated with data from a location in memory (e.g., physical address in main memory) and the processor can select an operation to be processed next based on the contentiousness of the respective location. For example, the processor can execute one of the multiple memory operations for the thread and if the location associated with the memory operations is contentious can prioritize one or more of the remaining memory operations so that the remaining memory operations can be performed out-of-order and before one or more of the intervening operations. In one example, the multiple memory operations can be exclusive memory operations and the first memory operation can be a load exclusive that loads (e.g., reads) data from a location and can determine whether the location is locked and the second memory operation can be a store exclusive that acquires a lock on the location if the location is unlocked.

Advantages of the technology disclosed herein include, but are not limited to, enhancing a processor's use of cache to reduce the quantity and duration of performance bottlenecks arising from memory contention. The technology can accomplish this by reducing the amount of copies in private cache to decrease cache coherency overhead. The technology can also enable processors to process memory operations (e.g., store exclusives) more quickly by reducing the duration that memory locations are inaccessible (e.g., decrease the duration it takes to acquire a lock). The technology can also be used to process atomic operations more quickly by detecting when the atomic operation relates to an uncontentious location and using near atomic operations on local data instead of far atomic operations.

FIG. 1 illustrates an example computing device 100 that includes a processor with technology to track contention and to use the tracked contention to manage cache and process memory operations, in accordance with some embodiments of the present disclosure. Computing device 100 can include a processor 110, a cache 120, and a memory 130.

Computing device 100 can be any physical device and can be or include a server computing device (e.g., server), a distributed computing device (e.g., cloud device, cluster device), supercomputer, a personal computer (PC) (e.g., workstation, desktop, laptop, notebook), a mobile device (e.g., mobile phone, tablet), a vehicle (e.g., airplane, drone, train, automobile, or other conveyance), Internet of Things (IoT) device, embedded computer (e.g., one included in industrial equipment, or a networked commercial device), or any such computing device that includes one or more processors 110.

Processor 110 may refer to a processing device that includes one or more processing devices or processing units that are capable of executing instructions that encode arithmetic, logical, memory, or I/O operations. Processor 110 may be implemented as a single integrated circuit, two or more integrated circuits, or may be a component of a multi-chip module (e.g., in which individual microprocessor dies are included in a single integrated circuit package). Processor 110 can be or include one or more Central Processing Units (CPUs), Graphical Processing Units (GPUs), Data Processing Units (DPUs), Arithmetic Logic Units (ALUs), Floating Point Units (FPUs), Memory Management Units (MMUs), Memory Protection Units (MPUs), Application Specific Integrated Circuits (ASICs), Tensor Processing Units (TPUs), Digital Signal Processors (DSPs), Field Programmable Gate Arrays (FPGAs), Network Interface Controller (NIC), cache controller, storage controller, quantum processor, other processor, or a combination thereof.

Processor 110 can implement an Instruction Set Architecture (ISA) that functions as an interface between processor 110 and the computing device 100. The instruction set architecture may be the same or similar to Advanced RISC Machine (ARM®), x86 (e.g., Intel®, AMD®), PowerPC®, Scalable Processor Architecture (SPARC®), other computer architecture, or a combination thereof. Processor 110 can process the instructions in the set using a single processing core or using multiple processing cores 111A-Z.

Processing cores 111A-Z can be portions of processor 110 that are capable of reading and executing instructions of a computer program loaded from memory 130. A computer program can include instructions (e.g., executable data), information (e.g., non-executable data), or a combination thereof. The instructions can be dispatched by processor 110 into one or more pipelines, thereby exploiting instruction-level parallelism. A pipeline may attempt to keep multiple portions of the processor busy with some of the instructions by dividing the instructions into a series of sequential steps performed by different processor units with different parts of instructions processed in parallel. The instructions can be arranged as different streams of instructions, which are discussed below in regards to threads 113A-Z. In one example, each of processing cores 111A-Z can be a processing device and can include portions of the processor involved in executing instructions and include portions of cache 120 (e.g., includes the private caches of cache 120).

Cache 120 can be a hardware cache used by processor 110 to store data received from memory 130 (e.g., main memory). Cache 120 is part of a memory hierarchy and the memory hierarchy can be a part of tiered storage for computing device 100. The memory hierarchy can extend from processor registers at the lowest level to main memory at the highest level. The tiered storage can extend farther up to secondary storage (e.g., hard disk drive, solid state drive) and possibly to remote storage (e.g., distributed storage, network attached storage (NAS), storage area network (SAN)).

Cache 120 can include multiple different caches. The different caches can be caches that are physically separate (e.g., different portion of a chip or on different chips), different portions of the same cache (e.g., different portion of same bank of memory cells), or a combination thereof. The different caches can store data using any form of data storage technology and can include volatile memory (e.g., ephemeral or non-persistent memory), non-volatile memory (e.g., persistent memory), or a combination thereof. The data storage can include Random Access Memory (RAM) in the form of Static Random-Access Memory (SRAM), embedded Dynamic Random-Access Memory (eDRAM), other memory, or a combination thereof. As illustrated in FIG. 1, cache 120 can include a shared cache 122 and one or more private caches 124A-Z.

Shared cache 122 and private caches 124A-Z can be used by processor 110 to store data in memory 130 for access by one or more processing cores 111A-Z. Shared cache 122 can be shared by a set of multiple processing cores and can be the same or similar to System Level Cache (SLC), Last Level Cache (LLC), or Level 3 (L3) cache, other term, or a combination thereof. Private caches 124A-Z can each be private to a respective processing core. A private cache can be the same or similar to local cache, Level 1 (L1) cache, Level 2 (L2) cache, other cache, or a combination thereof.

In the example illustrated in FIG. 1, shared cache 122 can be used by all of the processing cores of processor 110 (e.g., processing cores 111A-Z) and can be positioned farther away from the processing cores and provide slower access compared to a respective private cache. Each of private caches 124A-Z can be exclusively used by a single processing core and can be located closer to the processing core to provide faster access to the processing core.

Threads 113A-Z are each a thread of execution that may be the smallest sequence of programmed instructions that can be managed independently by a scheduler of an operating system (OS), processor, or other portion of computing device 100 (e.g., OS threads, computing threads). In the example illustrated, each of threads 113A-Z can be executed by a different one of the processing cores 111A-Z. In other examples, one or more of threads 113A-Z can be executed on the same processing core concurrently (e.g., thread-level parallelism). Threads 113A-Z may correspond to the same computing process (e.g., a main thread and worker threads), different computing processes, or a combination thereof. Each of threads 113A-Z when executed by a processing core can cause a respective memory operation of memory operations 115A-Z.

Memory operations 115A-Z can be any operation performed by a processing device that accesses stored data. The access can involve one or more read accesses (e.g., loading data), write accesses (e.g., storing data), or a combination thereof. The stored data can be accessed from memory 130, shared cache 122, private cache 124A-Z, processor registers, other data storage, or a combination thereof. Memory operations 115A-Z can include one or more hardware instructions (e.g., processor instructions, CPU instructions), software instructions (e.g., function calls, machine code, byte code), firmware instructions (e.g., opcodes, microcode), other operations, or a combination thereof. In one example, memory operations 115A-Z can be external operations that are provided from a source external to processor 110 (e.g., kernel code, application code) and make calls to processor instructions (e.g., CPU instructions). In another example, memory operations 115A-Z can be internal operations that are provided from a source internal to processor 110 (e.g., cache controller logic). In either example, each of the memory operations 115A-Z can be an exclusive operation, an atomic operation, other operation, or a combination thereof.

Memory operations that are exclusive can involve using an exclusion mechanism that provides the memory operations of a particular thread with access to data without providing memory operations of one or more other threads with access to the data (e.g., absent, free, or missing access). The exclusion mechanism can be the same or similar to a concurrency control mechanism or synchronization mechanism and can involve one or more exclusion data structures. The exclusion data structure (e.g., synchronization primitive) can be the same or similar to a lock, semaphore, mutex, futex, barrier, other exclusion data structure, or a combination thereof. In one example, the operations can involve one or more locks and a memory operation can activate the exclusion mechanism (e.g., acquire the lock) and a subsequent memory operation can deactivate the exclusion mechanism (e.g., release the lock). In another example, the operations can involve one or more critical sections that include a section of executable code in which only one thread can execute and in certain cases cannot be interrupted (e.g., kernel code). The critical section can be guarded by one or more locks and because multiple threads are attempting to get into the critical section, contention can occur.

In one example, the memory operations 115A-Z can include load exclusive operations and store exclusive operations. A load exclusive operation and store exclusive operation can be used together to check whether a memory location is associated with a deactivated exclusion data structure and to update the exclusion data structure to activate an exclusion mechanism. In one example, the load exclusive operation can load data at a location in memory 130 into cache 120 and determine whether the exclusion mechanism for the memory location is activated by another requestor (e.g., another thread). If the exclusion mechanism is not activated, a store exclusive operation can be used to activate the exclusion mechanism for the requestor by storing data that updates the exclusion data structure. The store exclusive operation and/or load exclusive operation can perform one or more conditional operations based on the status of the exclusion data structure. For example, the store exclusive operation may conditionally activate the exclusion mechanism when it is not currently activated by another thread. After the store exclusive operation occurs, one or more store operations (e.g., non-exclusive store operations) can occur and cause the exclusion data structure to be deactivated (e.g., unlocked, removed, cleared, reset). In one example, both the load exclusive operation and the store exclusive operation can work together to acquire a lock. The load exclusive operation can check whether a lock is already acquired by another thread. If the lock is not acquired by another thread, a store exclusive operation can be used to attempt to acquire the lock. The store exclusive operation either passes, indicating that the lock was acquired, or fails, meaning that another thread may have acquired the lock. For example, another thread may have acquired the lock between the time the load exclusive operation finished and the time the store exclusive operation finishes.

Memory operations that are atomic can involve performing the one or more memory operations as an atomic transaction. The atomic transaction can be an indivisible and irreducible set of operations that either all occur or none occur. The set can include one or more exclusive or non-exclusive memory operations and the atomic transaction can provide atomicity that prevents the set of operations from partially occurring. Some examples of memory operations that are atomic (e.g., atomic memory operations) are Test-and-set operations, Fetch-and-add (FAA) operations, Compare-and-swap (CAS) operations, Load-Link/Store-Conditional (LL/SC) operations, read-modify-write, other atomic operation, or a combination thereof. In one example, the memory operations of a thread can be performed as an atomic transaction to avoid the thread from being preempted during the atomic transaction. In another example, the memory operations of a thread can be performed as an atomic transaction that allows preemption and can complete when the execution of the thread returns from preemption.

In either example, memory operations 115A-Z (whether atomic, exclusive, or other) can encounter contention 117.

Contention 117 occurs when memory operations of different threads contend with one another to access data from the same location in memory 130. For example, a first thread 113A can initiate an exclusive or atomic memory operation 115A that accesses data 134A of location 132A. A second thread 113B can initiate memory operation 115B that corresponds to the same location 132A but memory operation 115B will be unable to complete until first thread 113A is finished. Once the contention occurs, the location can continue to be classified as contentious even after the contention has been resolved. For example, after the first thread finishes with data at the location the other threads can access the location but the location can remain a contentious location. This is advantageous because once a location is contentious it is more likely to be contentious in the future and the technology disclosed herein can treat the location differently to enhance the overall performance of computing device 100.

Contention 117 can be, include, or involve thread contention, processing core contention, lock contention, or a combination thereof. The thread contention can occur when multiple threads executing on the same processing core or different processing cores contend to access a common memory location. The multiple threads can be part of the same computing process (e.g., multi-threaded process) or part of different computing processes. The different computing processes can be for the same operating system or different operating systems. The processing core contention can occur when multiple different processing cores of the same processor or different processors contend to access the common memory location. The lock contention can occur when a computing entity acquires a lock on the memory location and a different computing entity attempts to access the data at the location before the lock has been released. The different computing entities can include one or more different threads, processes, processing cores, processors, computing devices, hosts, nodes, other computing system, or a combination thereof.

Locations 132A and 132B are example locations in memory 130 that are being accessed by the set of memory operations 115A-Z. Location 132A is an example of a contentious location because it was the object of contention 117, as discussed above. Location 132B is an example of an uncontentious location because even though threads 113Y and 113Z cause respective memory operations 115Y and 115Z that access location 132B the accesses occur without causing contention. The accesses can be uncontentious for many reasons. In one example, the earlier memory operation 115Y may be neither an exclusive operation nor an atomic operation (e.g., no lock acquired) and therefore memory operation 115Y and 115Z can overlap or have concurrent access to location 132B (e.g., multiple read-only operations). In another example, the earlier memory operation 115Y may be exclusive or atomic but the later memory operation 115Z does not access location 132B until after thread 113Z is finished using memory location 132B (e.g., after the lock is released).

Locations 132A and 132B can be a location in an address space and can correspond to one or more addresses. The addresses can be physical addresses (e.g., physical memory addresses), virtual addresses (e.g., virtual memory address), logical addresses (e.g., logical memory address), other addresses, or a combination thereof. Each location can correspond to a block of data storage and the location can indicate the beginning of the block, the end of the block, or an intermediate location in the block. The locations in the address space can be accessed by processor 110 using interconnect 140.

Interconnect 140 can couple processor 110 with memory 130. As used herein, "couple with" or "coupled to" generally refers to a connection between components or devices, which can be an indirect communicative connection or direct communicative connection (e.g., without intervening components or devices), whether wired or wireless, including connections such as electrical, optical, magnetic, and the like. Interconnect 140 can provide a communication channel between processor 110 and memory 130. Interconnect 140 can include one or more interfaces, connectors, adapters, other piece of hardware or software, or a combination thereof. Interconnects 140 can implement a standard or proprietary communication protocol that includes or is based on Compute Express Link™ (CXL), Peripheral Component Interconnect™ (e.g., PCI, PCIe), Non-Volatile Memory Express™ (NVMe), Advanced Host Controller Interface™ (AHCI), Serial Advanced Technology Attachment Interface™ (e.g., SATA, mSATA), Small Computer System Interface™ (SCSI, iSCSI), Integrated Drive Electronics™ (e.g., IDE, EIDE), InfiniBand™, other communication technology, or a combination thereof.

In one example, interconnect 140 can be a CPU-to-Memory interconnect that connect one or more CPUs to memory 130 that is functioning as main memory (e.g., primary storage). Memory 130 can include one or more DIMMs (e.g., DRAMs) and can span one or more nodes (e.g., NUMA nodes) and include one or more local memory nodes, remote memory nodes, or a combination thereof.

In the example illustrated by FIG. 1, processor 110 can include a contention tracking component 112, a cache controller component 114, and an operation processing component 116. Contention tracking component 112 can enable processor 110 to detect the locations in memory that are the target of contention and update a data structure to indicate which of the locations in memory have been contentious, uncontentious, or a combination thereof. Cache controller component 114 can enable processor 110 to use the contention tracking to manage cache 120. This can involve performing cache allocation and eviction operations to store data from memory 130 in shared cache 122, private caches 124A-Z, other portion of processor 110, or a combination thereof. Operation processing component 116 can enable processor 110 to process memory operations 115 more efficiently and use contention tracking to perform out-of-order processing for particular memory operations (e.g., complementary store exclusive operations). Components 112, 114 and 116 are discussed in more detail below in regards to FIGS. 3-4.

Figure 2:
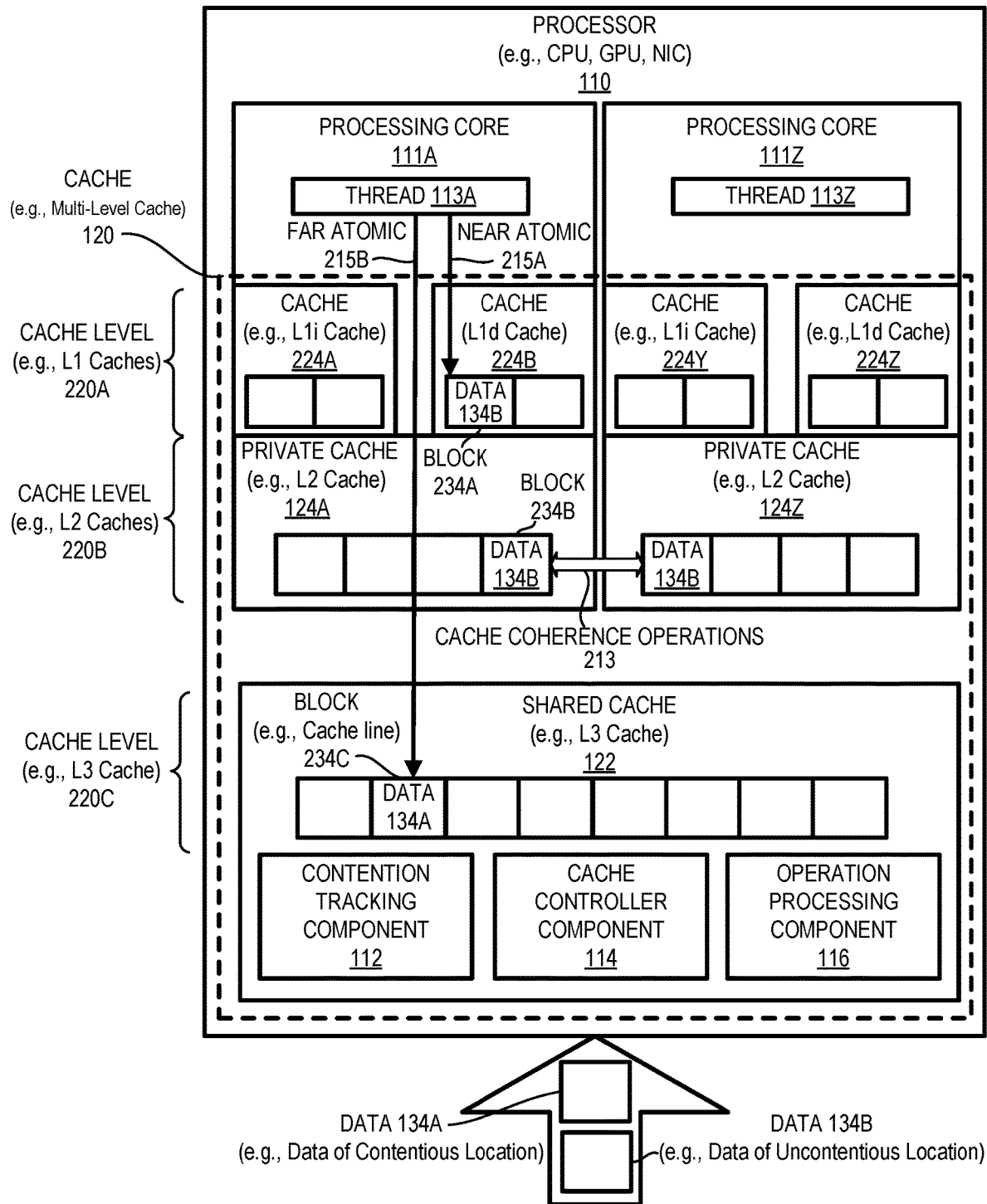
FIG. 2 is a diagram of the processor and a multi-level cache, in accordance with some embodiments of the present disclosure.

FIG. 2 illustrates an example processor 110 that includes technology to track contention and manage a multi-level processor cache, in accordance with some embodiments of the present disclosure. Cache 120 is the same or similar to cache 120 of FIG. 1 and illustrates the cache in more details. In the example illustrated, cache 120 can include a cache level 220A with caches 224A-Z, a cache level 220B with private caches 124A-Z, and a cache level 220C with shared cache 122.

Cache 120 can be a multi-level cache with a memory architecture that uses a cache hierarchy. The cache hierarchy can enable processor 110 to store the data from memory in one or more levels of cache 120 as cached data. The processing cores 111A-Z can access and process the cached data faster than accessing the data from memory 130 (e.g., main memory access). Accessing memory 130 each time can become a bottleneck for the performance of processing cores 111A-Z because they would have to waste cycles waiting for data to be retrieved from main memory. Processor 110 reduces the quantity of wasted cycles by using the multiple cache levels 220A-C.

During operation, processor 110 uses the multiple cache levels 220A-C. The cache controlling logic of processor 110 operates by checking the caches at lower levels before checking the caches at the higher levels. For example, processor 110 checks a cache at a lower cache level 220A (e.g., L1) and if the data is present (e.g., a cache hit) the processing cores can access it and if the data is absent (e.g., a cache miss) processor 110 continues checking other cache levels. Processor 110 can check the next level up, which is cache level 220B (e.g., L2), and so on, before determining that the data is absent from all levels of cache 120 and retrieving the data from memory 130 (e.g., main memory).

Each of cache levels 220A-C are communicably coupled to processor 110 and may be internal or external to processor 110. In the example illustrated in FIG. 2, all the levels of cache 120 can be internal to processor 110 (e.g., included inside the processor). A cache level is internal to the processor if it is on the die of the processor (e.g., on-chip) or if it is in the package of the processor (e.g., multi-chip module). Likewise, one or more cache levels 220A-C can include caches that are internal or external to a respective processing core of processor 110. For example, cache level 220A and 220B can include caches that are internal to their respective processing cores (e.g., part of a processing core) and cache level 220C can includes caches that are external to all the processing cores. In other examples, one or more levels of cache 120 can be external to processor 110 and its processing cores (e.g., outside the processor). For example, cache level 220C (L3) or one or more additional levels (e.g., L4) can be located external to processor 110 (e.g., off-chip and/or off-package). In either example, there may be one or more lower cache levels 220A-B (e.g., L1, L2) that function as private cache and one or more upper cache levels 220C (e.g., L3, L4, etc.) that function as shared cache.

Cache level 220A can be a lower level of cache 120 (e.g., lowest cache level) and can include one or more hardware caches that separate instruction data from non-instruction data. Caches that separate the instruction data (e.g., executable data) from information data (e.g., non-executable data) can be referred to as a separated cache. The separated cache of cache level 220A can included multiple different portions of the same hardware cache, multiple different hardware caches, or a combination thereof. In the example illustrated by FIG. 2, cache level 220A can be a first level cache (L1) that includes two separate local caches for each of the processing cores 111A-Z and processing core 111A can include cache 224A to store instruction data (e.g., L1i) and include cache 224B to store information data (e.g., L1d). The caches in cache level 220A may be private caches and may be referred to as local caches because they are internal to the processing core or are the closest caches to each respective processing core.

Cache level 220B can be an intermediate level of cache 120 and can include caches that are unified. A cache that is unified avoids separating instruction data and has a combination of both instruction data and information data and can be referred to as unified cache, combined cache, or other term. In the example illustrated by FIG. 2, cache level 220B can be a second level cache (L2) and include a single unified cache for each of processing cores 111A-Z and processing core 111A can use private cache 124A and processing core 111Z can use private cache 124Z. The caches in cache level 220B may be private to a respective processing core (as shown) or may be private to a subset of processing cores 111A-Z (e.g., private to a pair of cores). The caches in cache level 220B may not be the closest to the processing core but may still be considered local cache when they are part of the processing core.

Cache level 220C can be a higher level of cache 120 and can include one or more shared caches. Cache level 220C can be the highest level of cache 120 (e.g., when absent L4). The highest level of cache is the last level before main memory and can be referred to as the last level cache (LLC). In the example illustrated by FIG. 2, cache level 220C can be a third level cache (L3 cache) and can include a single shared cache 122 that is shared by all the processing cores 111A-Z. Shared cache 122 can be a unified cache that stores both instruction data and information data and can be the same or similar to shared cache 122 of FIG. 1. Cache level 220C can be internal to processor 110 (as illustrated) or can external to processor 110 (e.g., off-chip or off-package). In one example, cache level 220C can be exclusively used by processor 110 (e.g., system level cache). In another example, cache level 220C can be used by multiple processors (e.g., global cache). In either example, cache level 220C can be part of a multi-level CPU cache that includes one or more unified cache levels and one or more separating cache levels that can be used to store data 134A-B.

Data 134A-B can be received by processor 110 from main memory and can be stored in cache 120. Data 134A-B that is stored in cache 120 can be referred to as cached data and can include instruction data (e.g., executable data), information data (e.g., non-executable data), other data, or a combination thereof. The instruction data can include executable data of a computer program that is loaded into main memory and can include one or more processor instructions (e.g., CPU instructions, GPU instructions). The information data can be non-executable data that is created, read, updated, or deleted by processor 110 before, during, or after executing the processor instructions. In one example, data 134A-B can be data of one or more variables (e.g., shared variables or constants), file system object (e.g., shared files, links, directories), database object (e.g., record, tuple), other data storage object, or a combination thereof. Data 134A-B can be stored in cache 120 as one or more blocks 234A-C.

Blocks 234A-C are units of data storage and can be stored in cache 120, in memory 130, or a combination thereof. Blocks of data that are stored in cache can be referred to as cache blocks and blocks that are stored in memory can be referred to as memory blocks. The cache blocks can also be referred to as cache lines and their structure is discussed in more detail below in regards to FIG. 3. The size of blocks 234A-C can be the same across the levels of cache 120 or can be different across the levels of cache 120. In one example, the size of blocks 234A-C in cache 120 can be the same as one another and may or may not match the size of the blocks received from main memory (e.g., cache block and memory block size are the same). In another example, the size of blocks 234A-C in cache 120 can be different from one another and blocks at a lower level (e.g., L1) can be smaller than the blocks at an intermediate level (e.g., L2) and blocks at the intermediate level can be smaller than the blocks at the higher level (e.g., L3). In the example illustrated by FIG. 2, blocks 234A-C are cache blocks that are stored at different levels of cache 120. Block 234A is stored in cache level 220A (L1), block 234B is stored in cache level 220B (L2), and block 234C is stored in cache level 220C (L3).

Processor 110 can use cache controller component 114 to access and store data 134A-B in cache 120. Processing core 111A may attempt to access data 134A-B and processor 110 can retrieve data 134A and data 134B from main memory. Processor 110 can determine that data 134A corresponds to a contentious location (e.g., contention data) and that data 134B corresponds to an uncontentious location (e.g., uncontentious data). Processor 110 can store a copy of contentious data 134A in shared cache 122 so that the same copy of contentious data 134A is accessible to all of processing cores 111A-Z, which can reduce cache coherence operations.

Processor 110 can store a copy of uncontentious data 134B in private cache 124A (L2) for the particular processing core 111A that attempted to access it. Storing the uncontentious data in the private cache lets the uncontentious data be accessed more quickly but can introduce additional cache coherency (e.g., when the data is being used by one or more of the other processing cores). For example, at a subsequent point in time processing core 111Z may attempt to access the same data 134B. Processor 110 can create a copy of data 134B and store it in private cache 124Z (L2) for use by processing core 111B. Cache 120 now includes multiple copies of data 134B in cache level 220B (L2) and processor 110 will consume additional computing resources (e.g., processor overhead) to keep the copies coherent by performing one or more cache coherence operations 213.

Cache coherence operations 213 are operations performed by processor 110 to maintain cache coherence. Cache coherence is the uniformity of data stored in multiple caches of cache 120. When a processing core modifies data that is shared by other processing cores the data can become incoherent across the different copies. Cache coherence operations 213 can be used to manage the cache and indicate which copies are incoherent (e.g., stale), to update incoherent copies of the data, or a combination thereof. Cache controller component 114 and cache coherency is discussed in more detail below in regards to FIG. 3.

The location where the data is stored can cause an atomic operation to be either a near atomic 215A or a far atomic 215B. Near atomic 215A can involve operating on data that is local and far atomic 215B can involve operating on data that is non-local. In one example, data is local if it is stored local to the processing core that is executing the atomic operation. When the data is stored internal to the processing core (e.g., local cache, private cache, L1/L2), the atomic operation can be a near atomic and when the data is stored external to the processing core (e.g., shared cache, L3/L4) the atomic operation can be a far atomic. In another example, data is local if it is stored local to the processor that is executing the atomic operation. When the data is stored internal to the processor, the atomic operation is a near atomic and when the data is stored external to the processor (e.g., off-chip or off-package, L3/L4) the atomic operation is a far atomic. In either example, processor 110 may default to using far atomic operations to reduce cache coherence overhead and by detecting the atomic operation corresponds to an uncontentious operation processor 110 can perform near atomic operations, which are faster than the far atomics.

Figure 3:
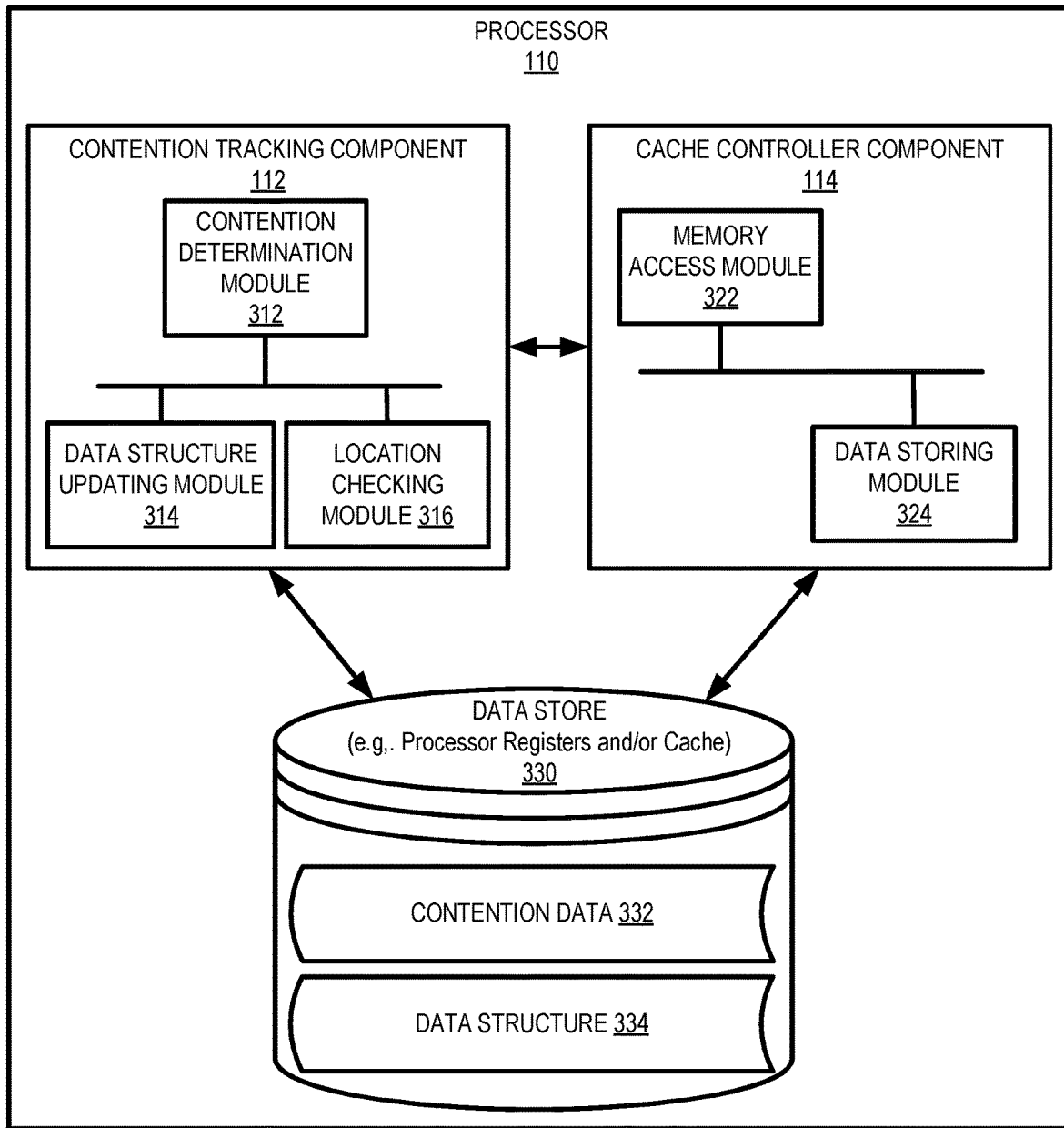
FIG. 3 is a detailed block diagram of a processor that illustrates example components and modules for managing cache based on contention, in accordance with some embodiments of the present disclosure.
Figure 4:
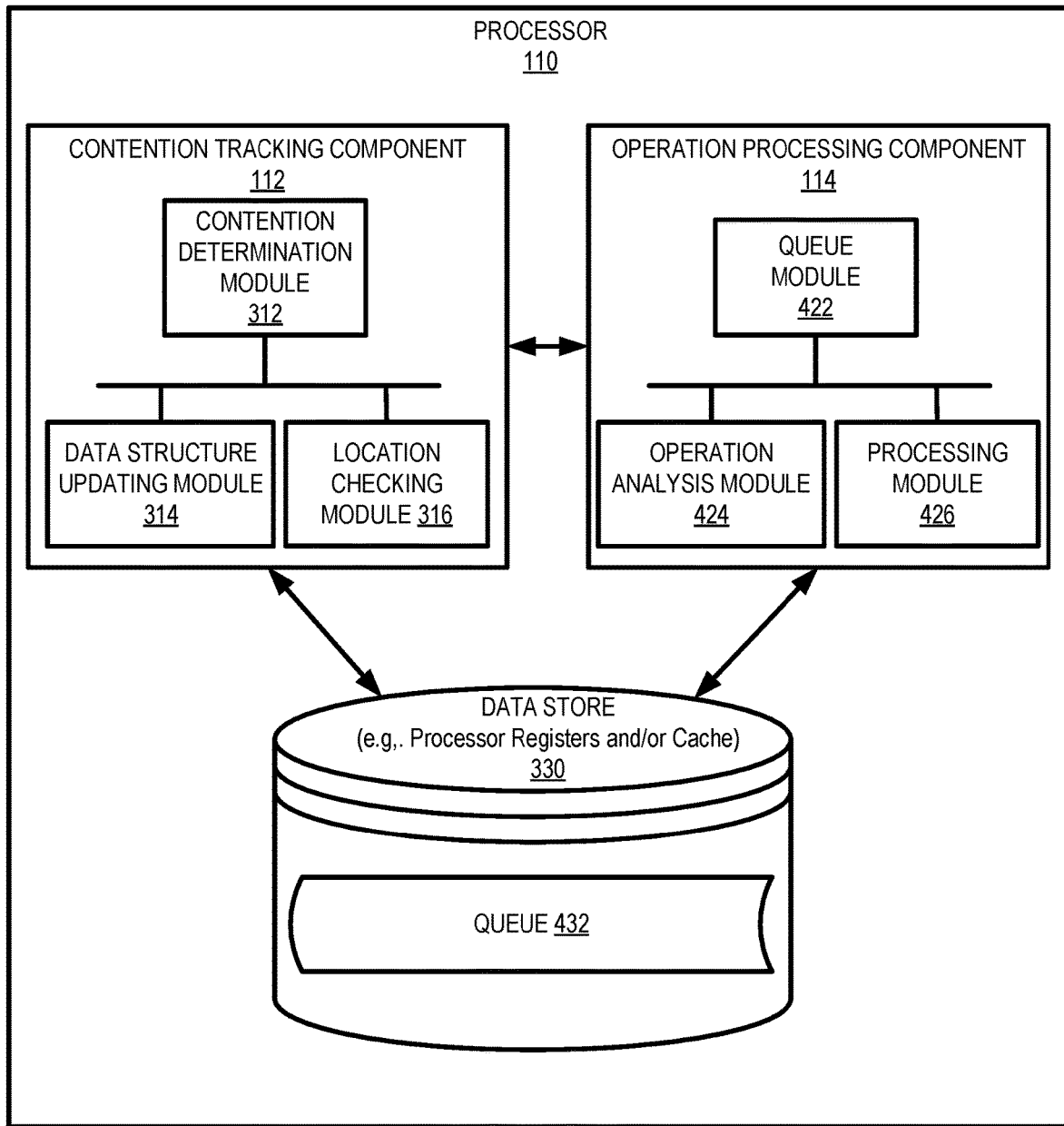
FIG. 4 is a detailed block diagram of a processor that illustrates example components and modules for managing memory operations based on the contention, in accordance with some embodiments of the present disclosure.

FIGS. 3-4 are block diagrams illustrating exemplary processor 110 with technology to track contention for data in memory and to use the tracked contention during its operation, in accordance with some embodiments of the present disclosure. In FIG. 3, processor 110 can use the tracked contention to manage the cache and determine where to store the data in the cache. In FIG. 4, the processor 110 can use the tracked contention to manage memory operations and determine which memory operations can be performed out-of-order.

The features discussed in regards to the components and modules of FIGS. 3-4 can be implemented in software (e.g., program code) or hardware (e.g., circuitry) of processor 110. More or less components or modules can be included without loss of generality. For example, two or more of the components can be combined into a single component, or features of a component can be divided into two or more components. Referring to FIG. 3, processor 110 can include a contention tracking component 112 and a cache controller component 114.

Contention tracking component 112 can be used to detect the locations in memory that are the target of contention and update one or more data structures to indicate which of the locations in memory have been contentious, uncontentious, or a combination thereof. In one example, contention tracking component 112 can include a contention determination module 312, a data structure updating module 314, and a location checking module 316.

Contention determination module 312 can enable processor 110 to determine that contention exists at a location in memory. Contention can occur when a first set of one or more memory operations (e.g., first thread) contend with a second set of one or more memory operations (e.g., second thread) to access data from a common location in memory. The common location could arise when the memory operations correspond to the same memory location or can occur when the memory operations correspond to different memory locations but the different memory locations both include at least one common location (e.g., overlapping portion of memory).

Contention determination module 312 can detect an occurrence of contention by detecting one or more computing events. The computing events can include one or more particular errors, faults (e.g., cache miss, page fault), exceptions, traps, or state transitions. The state transitions can be for exiting or entering a thread state (e.g., waiting, blocked, paused, sleep, running, halted, terminated), a lock state (e.g., locked, unlocked, open, closed), other state transition, or a combination thereof. Contention determination module 312 can make a prediction as to whether there is contention (e.g., contentious), whether there is an absence of contention (e.g., uncontentious, without contention, missing contention), whether the contention will continue, whether the absence of contention will continue, whether the contention or absence of contention will occur in the future, other prediction, or a combination thereof.

Contention determination module 312 can enable processor 110 to register one or more event listeners that trigger an analysis in response to the event occurrence. In one example, contention determination module 312 can detect a lock contention in response to a subsequent thread failing to acquire a lock on the locked memory location (e.g., failed lock attempt) or failing to access the locked memory location (e.g., read error, write error), the latter can be absent any attempt to acquire a lock. In another example, contention determination module 312 can detect barrier contention. A barrier is a software mechanism to ensure that a set of threads have all reached a certain point within their instruction streams before any thread is allowed to continue past that point. The point may be before, within, or after one or more critical sections.

Data structure updating module 314 can enable processor 110 to update one or more data structures 334 based on the detected or predicted contention. Data structure 334 can be any data structure used by processor 110 to manage one or more portions of the memory hierarchy, which includes processor registers, cache, main memory, or a combination thereof. Data structure 334 can include metadata that defines, describes, or organizes the data that is stored in cache and main memory. Data structure 334 can be stored in storage space of the processor (e.g., registers, cache), primary storage (e.g., main memory), in secondary storage (e.g., hard drive, solid state drive), other storage location, or a combination thereof. Data structure 334 can include a set of one or more entries that correspond to the locations in memory. Data structure 334 can represent the set as one or more lists (e.g., linked list), arrays (e.g., multi-dimensional array, matrix, table), other storage objects, or a combination thereof.

The entries in the set can each correspond to one or more memory locations and can each include contention data (e.g., contention data 332) that indicates whether the one or more memory locations are contentious, uncontentious, or a combination thereof. In one example, the data structure 334 can include a set (e.g., table, linked list) that includes an entry (e.g., row, column, element, node) for each memory location that is contentious (e.g., contention data) without including an entry for the memory locations that are uncontentious or vice versa. In another example, the data structure 334 can include a set (e.g., bit map) with an entry representing each location in memory and an indicator (e.g., bit flag, contention data) for each location that indicates whether the location is or is not contentious. In yet another example, the data structure 334 can be a cache data structure that includes a set of cache entries with an embedded contention data (e.g., contention indicator).

A cache entry can include a structure with one or more tags, data blocks, and indicators. Each tag can include location metadata that represents the location in memory corresponding to the cache entry. The location metadata can include the entire location identifier (e.g., address) or a portion of the identifier (e.g., lower or higher order bits of address). Each data block can include the data from the memory that is being stored in the cache and can be the same or similar to a cache line or cache block. Each of the indicators can include one or more bits that indicate the state of the data block and can correspond to contention (e.g., contentious or uncontentious), coherence (e.g., stale, valid, invalid), updated (e.g., unwritten, dirty, clean), locked (e.g., locked, unlocked), shared, other state, or a combination thereof.

Data structure updating module 314 can indicate a location is a contentious location responsive to a single instance of contention or responsive to multiple instances of contention. In one example, a memory location can be a contentious memory location if the memory location is the target of contention at least once (e.g., a single instance of contention). In another example, the memory location can be a contentious memory location if one or more measures of contention satisfy one or more thresholds (e.g., above, below, or equal to threshold values). The measure of contention may be based on one or more amounts of contention (e.g., x instances), durations of contention (e.g., y clock cycles, y nanoseconds), rates of contention (e.g., x instances per y duration), number of computing entities involved in the contention (e.g., z threads attempted while locked), types of computing entities involved (e.g., threads, processes, cores, processors, computing devices), other measure, or a combination thereof.

Once a data structure is updated to indicate the location is contentious, the location can remain contentious even after the contention has been resolved. For example, after the contention is resolved (e.g., location unlocked) the contention indicator can remain. The contention indicator can remain for any duration of time and until the data structure is updated to remove the indication. Updating the data structure to remove the indication can involve a removal operation that updates the set to remove the indicator, the location, the entry, or the entire data structure. The removal operation can be the same or similar to a toggle (e.g., bit flip), replace (e.g., overwrite), deletion of entry, deletion of the data structure, empty, flush, other operation, or a combination thereof. The removal operation may occur at a predetermined time (e.g., n nano seconds, scheduled time, after time period) or in response to a computing event (e.g., thread termination, power cycle, page in/out, context switch, load/store).

Location checking module 316 can enable processor 110 to determine whether one or more particular locations in memory are contentious, uncontentious, or a combination thereof. Determining whether a particular location is contentious can involve accessing and analyzing data structure 334 using the location in memory (e.g., location data in tag). This can involve identifying an entry in the set based on the location and determining if the entry indicates the location is contentious or uncontentious.

Cache controller component 114 can access data of contention tracking component 112 and use the data to manage cache 120. This can involve performing cache allocation and eviction operations to store data from memory in shared cache, private cache, other portion of cache, or a combination thereof. In one example, cache controller component 114 can include a memory access module 322 and a data storing module 324.

Memory access module 322 can enable processor 110 to access main memory to retrieve data at a location in memory. Memory access module 322 can receive the location in memory as input or may receive a different location and resolve the location (e.g., logical or virtual location) to a location in memory (e.g., physical location). Resolving the location can involve one or more operations to map one or more first addresses (e.g., logical or virtual address) to one or more second addresses (e.g., physical address), which may or may not use a translation lookaside buffer (TLB). Memory access module 322 can use one or more interconnects (discussed above) to access data stored at the location. As discussed above, accessing data in memory can involve read access, write access, or a combination thereof. The read access may involve loading data into cache from memory and involves processor 110 receiving the data from the location in the memory. The write access may involve storing the data from cache into memory and involves processor 110 sending the data from cache to the location in memory.

Data storing module 324 can enable processor 110 to store the data received from main memory in one or more caches of processor 110. Data storing module 324 can determine where in the cache of the processor to place the data. As discussed above, the processor cache can include multiple caches at different levels and can include a shared cache and one or more private caches. Data storing module 324 can use data of contention tracking component 112 to determine where in the processor cache to store the data. As discussed above, when the data corresponds to a contentious location, data storing module 324 can store the data in the shared cache (e.g., L3). When the data corresponds to an uncontentious location, data storing module 324 can be stored in the one or more of the private cache (e.g., L2, L1d).

For contentious locations, data storing module 324 can store the data as a single copy in shared cache and avoid having multiple copies of the data in private caches. In one example, the entire processor cache (e.g., L1-L3) may have a single copy of the data and the single copy is in shared cache (e.g., in L3, but not in L2 or L1). In another example, the entire processor cache may have a single copy in shared cache (e.g., in L3) and a single copy in private cache (e.g., L1d, but not L2). The latter situation may always or occasionally occur due to processor design. In either of these examples, data storing module 324 can avoid having multiple copies in the private caches. This can significantly reduce the cache coherence overhead because the data is from a contentious location and would likely be accessed by multiple cores and would have otherwise been stored in the respective private caches of the multiple cores.

For uncontentious locations, data storing module 324 can bypass the shared cache by not allocating storage space in the shared cache to store a copy of the data. In one example, the data may still be received by the shared cache and can pass through the shared cache before being received and stored in a respective private cache (e.g., L2).

As discussed above, processor cache can avoid having multiple copies in the private caches (L2) and can be referred to as a mostly exclusive cache, partially exclusive cache, non-inclusive, other term, or a combination thereof. The cache may be a "mostly exclusive cache" or "partially exclusive cache" because the cached data will typically be stored once in the multiple cache levels of a processing core but there are some situations where there will be multiple copies (e.g., a copy in private L1d and in shared L3). In one example, processor cache can be an "exclusive unified cache" because it includes a single copy of data in the unified cache portions for a particular processing core even though there may be another copy in the separated cache portions of the particular processing core (e.g., L1d or L1i).

Data storing module 324 can handle the allocation and eviction of data from cache. The eviction of data from cache can involve removing data (e.g., evicting) from the cache to free space in cache to store incoming data. The eviction can be based on the contentiousness of the memory location of the data. For example, the evicting can prioritize removal of data corresponding to an uncontentious location over removal of data corresponding to a contentious location. Data that is evicted from cache can be subsequently overwritten when the space is used to store incoming data. Data storing module 324 can handle allocating the space. In one example, allocating the space can involve generating a cache entry comprising a tag, a cache line, and a set of indicators. As discussed above, the tag can indicate the memory location and the cache line can include the data from the memory location. The set of indicators can include one or more of a contention indicator, a dirty indicator, and a stale indicator.

Referring to FIG. 4, processor 110 can include technology to track contention for data in memory and use the tracked contention to process memory operations, in accordance with some embodiments of the present disclosure. Processor 110 can include contention tracking component 112 and an operation processing component 116. Contention tracking component 112 can be the same or similar to the contention tracking component 112 discussed above in regards to FIG. 4.

Operation processing component 116 can enable processor 110 to process memory operations 115 more efficiently and use contention tracking to perform out-of-order processing for particular memory operations (e.g., a store exclusive operation that compliments a prior load operation of the same thread). In one example, operation processing component 116 can include a queue module 422, an operation analysis module 424, and a processing module 426.

Queue module 422 can enable processor 110 to manage an ordered set of operations. Managing the ordered set of operations can involve adding operations, removing operations, reordering the operations, or a combination thereof. The operations in the set can include any operation performed by processor 110 and can include memory operations and any non-memory operations performed by a processor 110. The memory operations are discussed above in regards memory operations 115 and can be the same or similar to memory access operations that involve accessing data in main memory (e.g., read access or write access) or managing the access (e.g., locking, exclusion, or synchronizing). The ordered set of operations can be stored by queue 432.

Queue 432 can be a data structure for storing and organizing a set of operations. Queue can be the same or similar to a buffer, array, list, other storage structure, or a combination thereof. In one example, queue 432 can include both memory operations and non-memory operations. In another example, the queue 432 can include memory operations without included non-memory operations. In either example, queue 432 can include one or more receipt queues that stores operations before, during, or after the operations are processed. Once the operations are processed (e.g., completed), the operations may be removed from queue 432 or can be updated to indicate they have been processed and remain in queue 432 until they are overwritten (e.g, circular queue).

Operation analysis module 424 can enable processor 110 to analyze the operations in the set (e.g., in queue 432). Operation analysis module 424 can detect that the set includes load memory operations, store memory operations, and zero or more intervening operations. A thread can include a load memory operation for a particular memory location and can include one or more complementary store memory operations for the same memory location (e.g., complementary load/store pair for thread A). The intervening operations can be between these complementary load and store memory operations in the ordered set. The intervening operations can be any type of operation and can include memory operations (e.g., load or store of another thread), non-memory operations (e.g., comparisons, data manipulation), or a combination thereof.

The load and store operations can be exclusive operations, atomic operations, or a combination thereof. In one example, the load and store memory operations can be exclusive memory operations. For example, the load memory operation can be an exclusive load operation caused by executing a load-exclusive processor instruction of a thread and the store memory operation can be an exclusive store operation that is caused by executing a store-exclusive processor instruction of the same thread. The exclusive load operation can determine whether a lock for the memory location was previously acquired by another thread and the exclusive store operation can acquire the lock. In another example, the operations in the ordered set can include atomic operations that perform a load and store as a single transaction that may or may not acquire the lock for the memory location.

Processing module 426 can enable processor 110 to process the operations in the ordered set of operations. The set of load and store memory operations can have a particular order. The order may be based on a first-in first out (FiFo). The order may be used as input to determined when to process the memory operations. Processing module 426 can access data of contention tracking component 112 (e.g., metadata and data structures) and use the data to process operations out-of-order. For example, processing module 426 can processes a later memory operation for a contentious location before processing an earlier memory operation for an uncontentious location. In one example, processing module 426 can process a load exclusive memory operation for a contentious memory location based on the existing order of the set and can process the complementary store exclusive memory operation out-of-order. In another example, processing module 426 can process both the load exclusive and store exclusive for a contentious location out-of-order. In either example, processing an operation out-of-order means it can bypass (e.g., skip) one or more earlier operations which can decrease the duration of time it takes to acquire a lock, maintain a lock, release a lock, or a combination thereof for the contentious location.

Processing module 426 can enable processor 110 to process the set of ordered operations (e.g., queue 432) using multiple threads. Processor 110 can use a first thread to process memory operations for loading data from main memory into cache (e.g., load exclusive memory operations). Processor 110 can use a second thread to process memory operations for storing data to the main memory from cache (e.g., store exclusive memory operations). The second thread can analyze the set of ordered operations and identify complementary store operations and process them out-of-order.

Processing module 426 can also use data of contention tracking component 112 to more efficiently process atomic operations. Atomic operations may be processed using far atomic memory operations by default to reduce cache coherence overhead. Processing module 426 can detect whether the atomic operation corresponds to a contentious location or an uncontentious location. When the atomic operation corresponds to an uncontentious location the processing module 426 can process the atomic operation as a near atomic operation (e.g., on local data). When the atomic operation corresponds to a contentious location the operation processing module can process the atomic operation as a far atomic. This may be advantageous because processing module 426 can override the typical processing of atomic operations to process memory operations more quickly.

Figure 5:
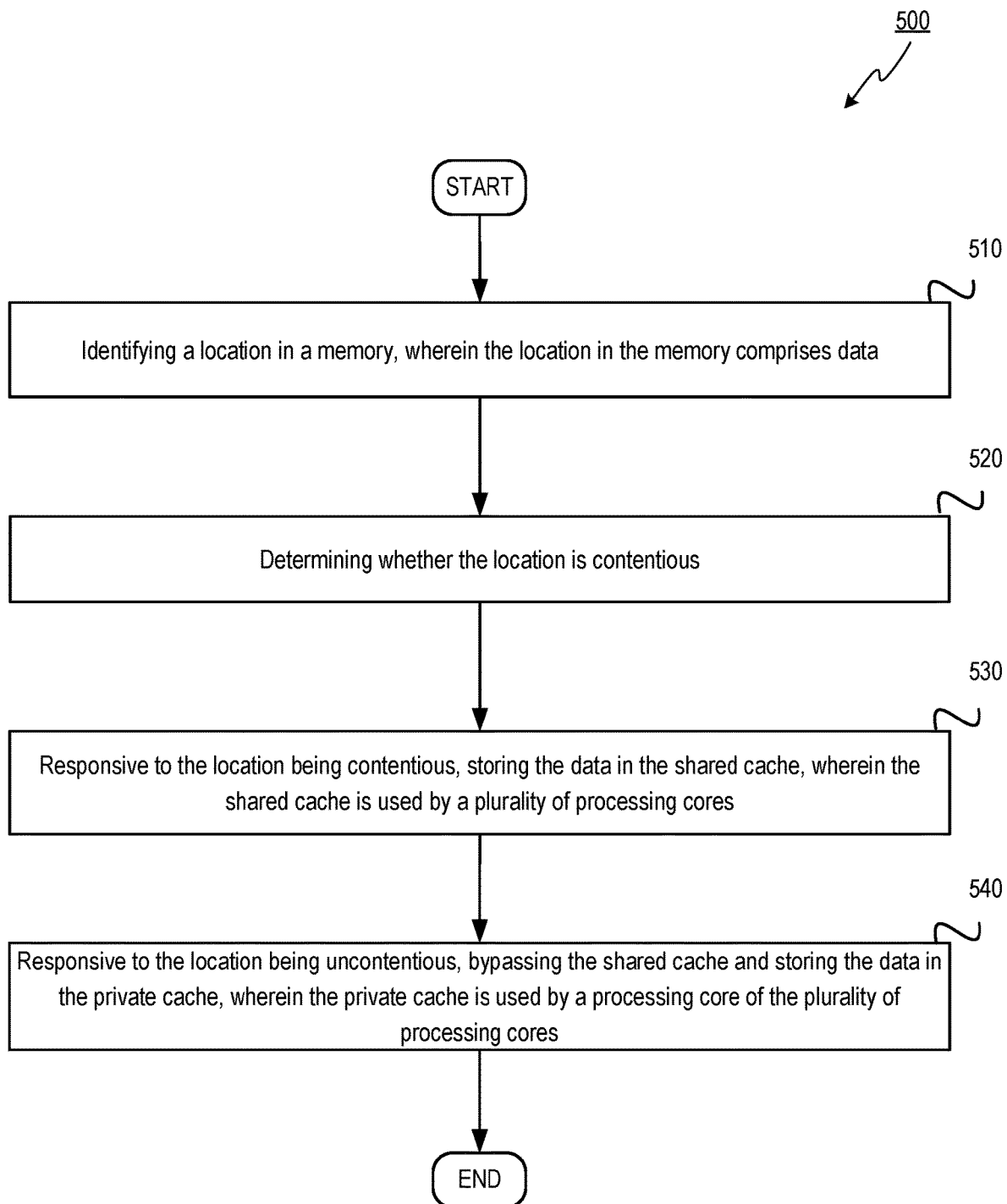
FIG. 5 is a flow chart of a method for using contention tracking to manage cache, in accordance with some embodiments of the present disclosure.

FIG. 5 is a flow chart of a method 500 for using contention tracking to manage cache, in accordance with some embodiments of the present disclosure. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by processor 110 of FIGS. 1-4. Although shown in a particular sequence or order, unless otherwise specified, the order of the processes can be modified. Thus, the illustrated embodiments should be understood only as examples, and the illustrated processes can be performed in a different order, and some processes can be performed concurrently or in parallel. Additionally, one or more processes can be omitted in various embodiments. Thus, not all processes are required in every embodiment. Other process flows are possible.

At operation 510, the processing logic of a processing device can identify a location in a memory and the location in the memory includes data. The processing logic can receive the data from the location in the memory and generate a cache entry that includes a tag, a cache line, and a set of indicators. The tag can include the location, the cache line can include the data from the location in the memory, and the set of indicators can include one or more of a contention indicator, a dirty indicator, and a stale indicator. In one example, the processing logic can have access to a multi-level processor cache comprising a separating cache level and one or more unified cache levels. The separating cache level can separate instructional data from informational data and the one or more unified cache levels can each combine the instructional data with the information data. In one example, the processing logic can be part of a Central Processing Unit (CPU) that includes a plurality of processing cores and the cache (e.g., the multi-level processor cache).

At operation 520, the processing logic can determine whether the location is contentious. The location in the memory can be contentious if at least one thread was blocked from accessing the location while the location was locked by another thread. In one example, the processing logic can determine that a first thread acquired a lock on the location and detect a lock contention in response to a second thread failing to acquire a lock on the location. The first thread can execute on a first processing core and the second thread can execute on a second processing core. The processing logic can update a data structure to indicate the location is a contentious location.

At operation 530, the processing logic can store the data in the shared cache responsive to the location being contentious. The shared cache can be used by a plurality of processing cores. In one example, the data is stored as a single copy in the shared cache and avoids multiple copies of the data in private caches to reduce cache coherence operations. In another example, the cache can be a mostly exclusive cache that maintains a single copy of the data across multiple levels of the cache and the multiple levels include a unified cache level 2 (L2) and a unified cache level 3 (L3). The processing logic can evict data from the cache before, during, or after storing the data. The evicting can prioritize removal of data corresponding to an uncontentious location over removal of data corresponding to a contentious location.

At operation 540, the processing logic can bypass the shared cache and store the data in the private cache responsive to the location being uncontentious. The private cache can be used by a single processing core of the plurality of processing cores. The data can be stored in the private cache without being stored in the shared cache. The shared cache can be a level three (L3) cache that is shared by multiple processing cores and the private cache can include a level two (L2) cache and a level one (L1) cache that are private to one of the processing cores. In one example, the processing device can process a plurality of atomic operations on the data of the location. The plurality of atomic operations can be processed as far atomic operations when the location is contentious and processed as near atomic operations when the location is uncontentious.

Figure 6:
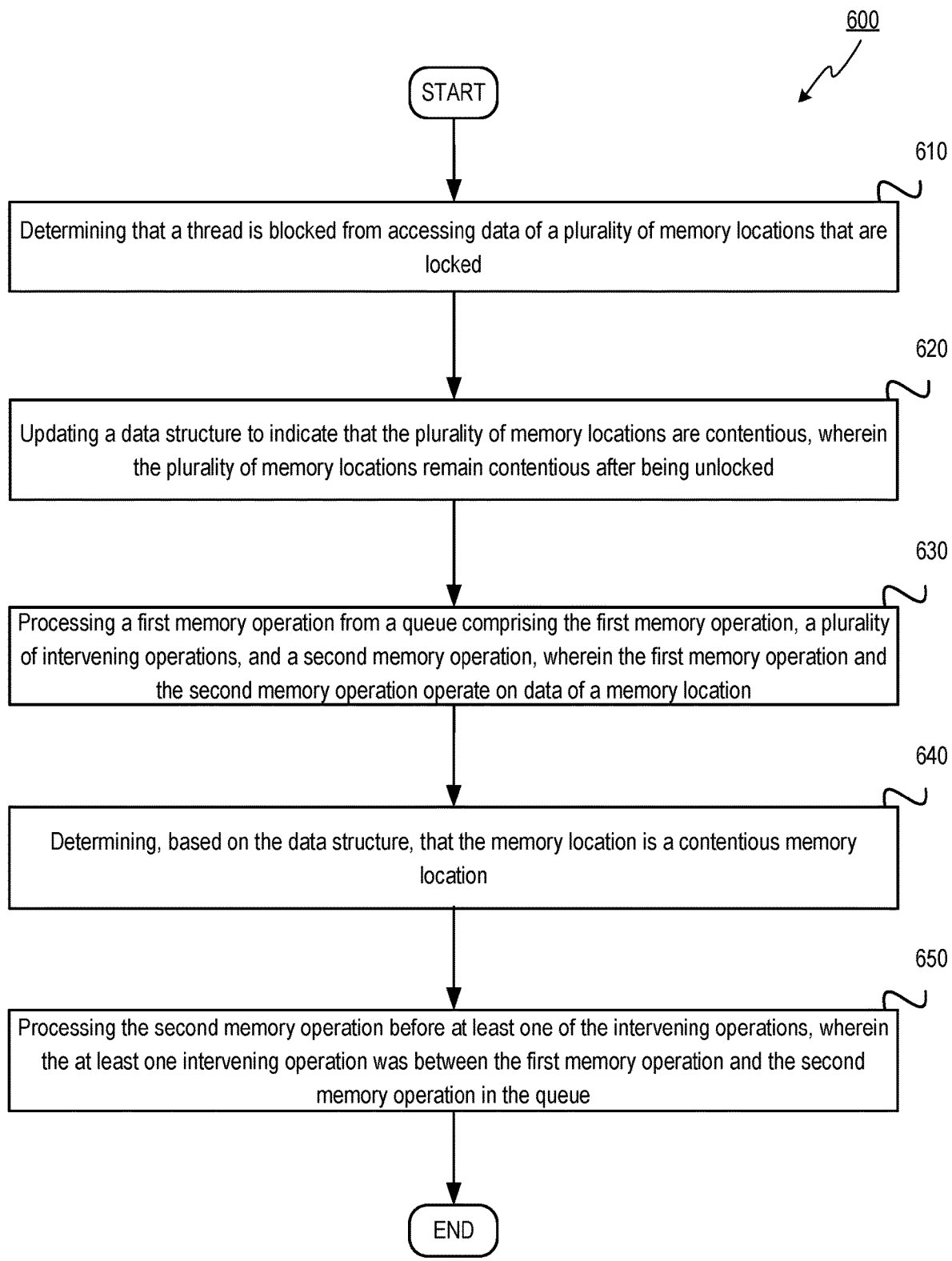
FIG. 6 is a flow chart of a method for using contention tracking to manage memory operations, in accordance with some embodiments of the present disclosure.

FIG. 6 is a flow chart of a method 600 for using contention tracking to manage memory operations, in accordance with some embodiments of the present disclosure. Method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by processor 110 of FIGS. 1-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic of a processing device can determine that a thread is blocked from accessing data of a plurality of memory locations that are locked. The processing logic can determine that a first thread acquired a lock on the memory location and detect a lock contention in response to a second thread failing to acquire a lock on one of the memory locations. The first thread can execute on a first processing core of the processing device and the second thread can execute on a second processing core of the processing device.

At operation 620, the processing logic can update a data structure to indicate that the plurality of memory locations are contentious and the plurality of memory locations can remain contentious after being unlocked. In one example, the processing logic can initiate the update responsive to detecting lock contention.

At operation 630, the processing logic can process a first memory operation from a queue. The queue can include the first memory operation, a plurality of intervening operations, and a second memory operation. The first memory operation and the second memory operation can operate on data of a memory location. The first memory operation and the second memory operation can occur while the memory location is locked. In one example, the first memory operation can be an exclusive load operation and the second memory operation can be an exclusive store operation. The exclusive load operation can be caused by executing a load-exclusive processor instruction of a thread and the exclusive store operation can be caused by executing a store-exclusive processor instruction of the same thread.

At operation 640, the processing logic can determine, based on the data structure, that the memory location is a contentious memory location. In one example, the memory location can be a physical memory address of main memory. The data structure can indicate physical memory addresses that have been contentious at any time during a predetermined time period.

At operation 650, the processing logic can process the second memory operation before at least one of the intervening operations. An intervening operation can be between the first memory operation and the second memory operation in the queue. Processing the second memory operation (e.g., store operation) before the at least one intervening operation in the queue can decrease a duration of time the contentious location is locked. The queue can be an ordered set of memory operations that include a plurality of exclusive load operations followed by a plurality of exclusive store operations. The processing logic can process all of the plurality of exclusive store operations that are for contentious locations before all of the plurality of exclusive store operations that are for uncontentious locations. In one example, the queue can be processed by multiple threads. A first thread can process memory operations for loading data and the second thread can process memory operations for storing data.

Figure 7:
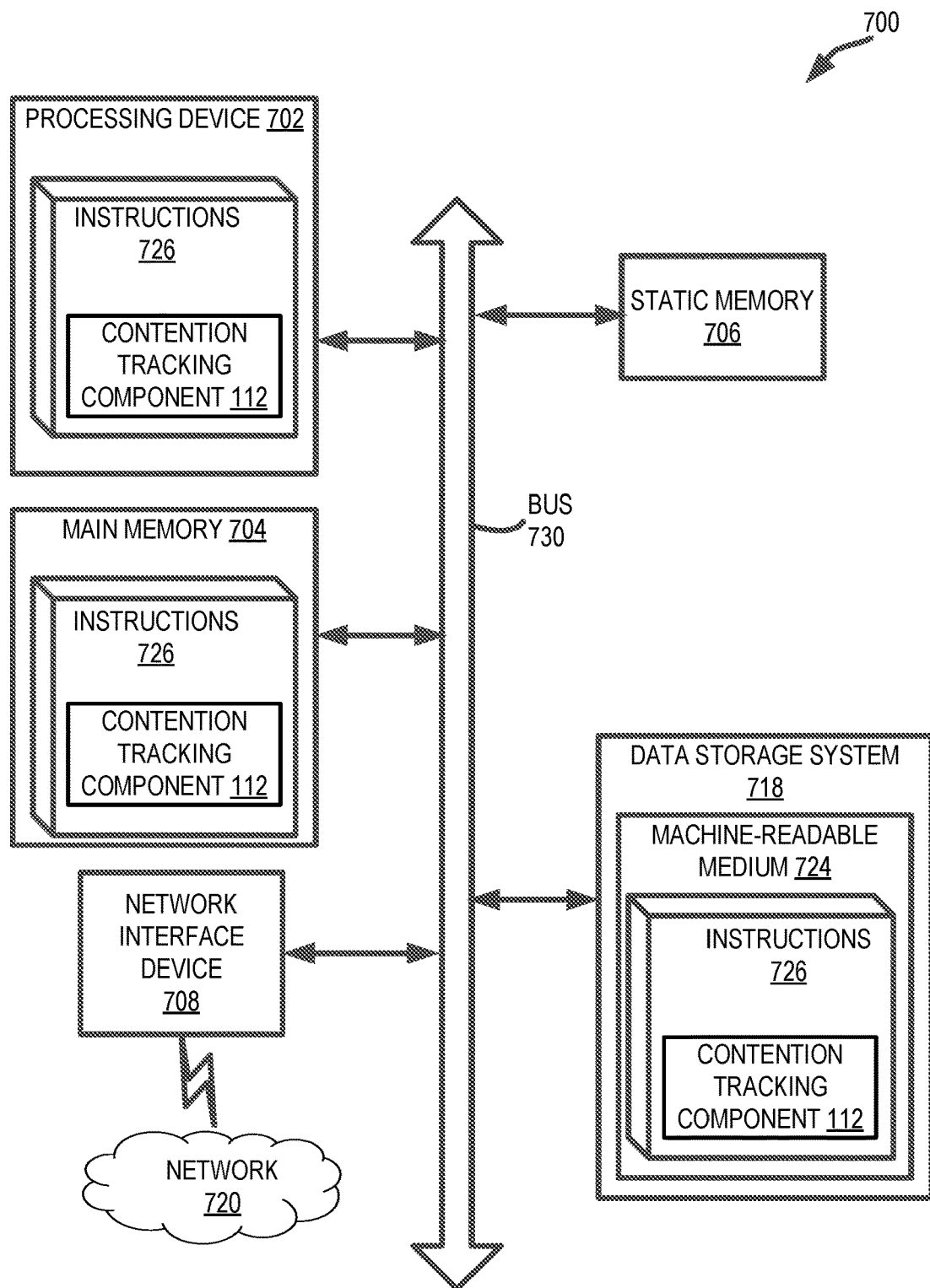
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can be a computing device that includes a processor with a cache controller, a memory controller, or combination thereof. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702 (e.g., Processor 110), a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to memory 130 of FIG. 1.

In one embodiment, the instructions 726 include instructions to implement functionality corresponding to the contention tracking component 112 of FIGS. 1-4. While the machine-readable storage medium 724 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a cache that comprises a shared cache and a private cache; and
a processing device, operatively coupled with the cache, to perform operations comprising:
identifying a first location and a second location in a memory, wherein the first location comprises first data and the second location comprises second data;
determining whether the first location is contentious and whether the second location is contentious;
responsive to the first location being contentious, storing the first data in the shared cache, wherein the shared cache is used by a plurality of processing cores;
responsive to the second location being uncontentious, bypassing the shared cache and storing the second data in the private cache, wherein the private cache is used by a processing core of the plurality of processing cores;
storing contention data associated with the first location in a data structure of the processing device responsive to the first location being contentious at a first time; and
updating the contention data responsive to the first location no longer being contentious at a second time.

2. The system of claim 1, wherein the system comprises a Central Processing Unit (CPU) that comprises the plurality of processing cores and the cache, and wherein the shared cache comprises a level three (L3) cache that is shared by the plurality of processing cores and the private cache comprises a level two (L2) cache and a level one (L1) cache that are private to the processing core.

3. The system of claim 1, wherein the first location in the memory is contentious when at least one thread was blocked from accessing the location while the location was locked by another thread.

4. The system of claim 1, wherein the first data is from a contentious location in the memory and is stored as a single copy in the shared cache and avoids multiple copies of the first data in private caches to reduce cache coherence operations.

5. The system of claim 1, wherein the second data is from an uncontentious location in the memory and is stored in the private cache without being stored in the shared cache.

6. The system of claim 1, wherein the operations further comprise processing a plurality of atomic operations, wherein the plurality of atomic operations are processed as far atomic operations when operating on data of a contentious location and are processed as near atomic operations when operating on data of an uncontentious location.

7. The system of claim 1, wherein the operations further comprise evicting data from the cache prior to the storing, wherein the evicting prioritizes removal of data corresponding to an uncontentious location over removal of data corresponding to a contentious location.

8. The system of claim 1, wherein at least one of the shared cache or the private cache comprises a separating cache level and one or more unified cache levels, wherein the separating cache level separates instructional data from informational data and the one or more unified cache levels each combine the instructional data with the informational data.

9. The system of claim 1, wherein the operations further comprise:
determining that a first thread acquired a lock on the first location, wherein the first thread is executing on a first processing core of the plurality of processing cores; and
detecting a lock contention in response to a second thread failing to acquire a lock on the first location, wherein the second thread is executing on a second processing core of the plurality of processing cores.

10. The system of claim 1, wherein the operations further comprise:
receiving, by the processing device, the first data from the first location in the memory; and
generating a cache entry comprising a tag, a cache line, and a set of indicators, wherein the tag comprises the first location, the cache line comprises the first data from the first location in the memory, and the set of indicators comprises one or more of a contention indicator, a dirty indicator, and a stale indicator.

11. The system of claim 1, wherein the private cache comprises a cache level 1 (L1) and a mostly exclusive unified cache level 2 (L2), and a single copy of the first data is maintained across multiple levels of the cache, wherein the multiple levels comprise the cache L1, the unified cache L2, and the shared cache, wherein the shared cache comprises a unified cache level 3 (L3).

12. The system of claim 1, wherein updating the contention data responsive to the first location no longer being contentious comprises removing, from the data structure, an entry of the data structure corresponding to the first location.

13. A method comprising:
identifying, by a processing device, a location in a memory, wherein the location in the memory comprises data;
determining, by the processing device, whether the location is contentious;
responsive to the location being contentious, storing the data in a shared cache, wherein the shared cache is used by a plurality of processing cores;
responsive to the location being uncontentious, bypassing the shared cache and storing the data in a private cache, wherein the private cache is used by a processing core of the plurality of processing cores;
storing contention data associated with the location in a data structure of the processing device responsive to the location being contentious at a first time; and
updating the contention data responsive to the location no longer being contentious at a second time.

14. The method of claim 13, wherein the processing device comprises a Central Processing Unit (CPU) that comprises the plurality of processing cores, the shared cache, and the private cache, and wherein the shared cache comprises a level three (L3) cache that is shared by the plurality of processing cores and the private cache comprises a level two (L2) cache and a level one (L1) cache that are private to the processing core.

15. The method of claim 13, wherein the location in the memory is contentious if at least one thread was blocked from accessing the location while the location was locked by another thread.

16. The method of claim 13, wherein the location is a contentious location and wherein the data is stored as a single copy in the shared cache and avoids multiple copies of the data in private caches to reduce cache coherence operations.

17. A system comprising:
a processor cache that comprises a shared cache and a private cache; and
a processor comprising a plurality of processing cores wherein the processor is operatively coupled with the processor cache and performs operations comprising:
identifying a first location and a second location in a main memory, wherein the first location comprises first data and the second location comprises second data;
determining whether the first location is contentious and whether the second location is contentious, wherein the first location in the main memory is contentious if at least one thread was blocked from accessing the first location while the first location was locked by another thread;
responsive to the first location being contentious, storing the first data in the shared cache, wherein the shared cache is used by the plurality of processing cores;
responsive to the second location being uncontentious, bypassing the shared cache and storing the second data in the private cache, wherein the private cache is used by a processing core of the plurality of processing cores; and
storing contention data associated with the first location in a data structure of the processor responsive to the first location being contentious at a first time; and
updating the contention data responsive to the first location no longer being contentious at a second time.

18. The system of claim 17, wherein the processor comprises a Central Processing Unit (CPU) that comprises the processor cache, and wherein the shared cache comprises a level three (L3) cache that is shared by the plurality of processing cores and the private cache comprises a level two (L2) cache and a level one (L1) cache that are private to the processing core.

19. The system of claim 17, wherein the first data is from a contentious location in the main memory and is stored as a single copy in the shared cache and avoids multiple copies of the first data in private caches to reduce cache coherence operations.

20. The system of claim 17, wherein the second data is from an uncontentious location in the memory and is stored in the private cache without being stored in the shared cache.

21. The system of claim 17, wherein the operations further comprise processing a plurality of atomic operations, wherein the plurality of atomic operations are processed as far atomic operations when operating on data of a contentious location and are processed as near atomic operations when operating on data of an uncontentious location.

* * * * *